Patented Nov. 27, 1923.

1,475,494

UNITED STATES PATENT OFFICE.

HENRY A. KOHMAN, ROY IRVIN, AND ROBERT J. CROSS, OF PITTSBURGH, PENNSYLVANIA, ASSIGNORS, BY MESNE ASSIGNMENTS, TO THE FLEISCHMANN COMPANY, A CORPORATION OF OHIO.

PROCESS FOR THE MANUFACTURE OF YEAST.

No Drawing. Application filed January 20, 1919. Serial No. 272,182.

*To all whom it may concern:*

Be it known that we, HENRY A. KOHMAN, ROY IRVIN, and ROBERT J. CROSS, all citizens of the United States, residing in Pittsburgh, Allegheny County, State of Pennsylvania, have invented certain new and useful Improvements in Processes for the Manufacture of Yeast; and we do hereby declare the following to be a full, clear, and exact description of the invention, such as will enable others skilled in the art to which it appertains, to make and use the same.

Prior to our present invention it has been proposed to utilize certain of the ammoniacal salts in the manufacture of yeast, particularly ammonium lactate and perhaps others of the organic ammoniacal salts, as additions to the yeast-growing wort or like medium. The employment of the inorganic ammoniacal salts has also been proposed, in like manner. The yield of yeast obtained by the use of the organic ammoniacal salts and the strength or vigor the yeast has, however, not been such as to justify, except under particularly favorable conditions, the extended use of these relatively expensive organic salts. So also, in so far as we are aware, the cheaper and more available inorganic ammoniacal salts have heretofore met with disfavor because of the meagre output obtained and the inferior quality of the product.

Our present invention is based upon the discovery that the failure to obtain a satisfactory yield in the employment of the inorganic ammoniacal salts, the failure to obtain a larger yield in the employment of the organic ammoniacal salts, and the failure to obtain a yeast of greater vigor, in the employment of either the organic or the inorganic ammoniacal salts, is due to a condition of the process which we have ascertained and which we have eliminated in the practice of the present invention.

It is accordingly an object of this invention to manufacture yeast from a nutrient solution containing essentially sugar material and other yeast nutrients including cereal material and compounds containing yeast-assimilable inorganic nitrogen, such as are readily obtainable at a low price on the market in large quantities, in such manner as to materially increase the yield and strength of the yeast as compared with that heretofore obtained by processes employing such nutrients, whereby substantial economy of materials is attained.

In the manufacture of yeast from the usual wort containing in solution protein, sugar and certain salts, particularly the acid salts of phosphoric acid, it is recognized that the growth of the yeast proceeds to advantage because of the acidity of the medium by reason of the presence of the acid salts, and that this favorable condition can be still further improved in some instances, by the addition of lactic acid, or the like, where, for any reason, the wort is lacking the necessary degree of acidity. The progress of the yeast-growing operation, and the quantity and quality of the resulting product is in no wise materially affected by said increase in acidity or concentration of the hydrogen-ion as is incident to the normal operation, that is, in the increase of acidity which may be due to lactic fermentation or to any small amounts of organic acids, such as formic, lactic or succinic acid or the like, which may possibly be formed by the yeast as intermediate products during alcohol fermentation, which is permitted to continue to the end without any attempt to compensate for this increase. In those operations wherein the ammoniacal salts have been proposed as an additional ingredient to the wort, it has not been heretofore ascertained that the increase in concentration of the hydrogen-ion is a factor to be considered in obtaining an increased yield or a stronger product.

The main characteristic feature of our present invention is based upon our discovery that in the utilization of an ammoniacal salt (either organic or inorganic) in a yeast-growing medium, such as a malt wort, or a solution containing protein and sugar derived from any other suitable source (as, for instance, a solution obtained from the corn product described in U. S. Patent No. 1,274,898 dated Aug. 6, 1918), the yield and the strength of the yeast product obtained is largely enhanced and improved by preventing any substantial increase in the original concentration of the hydrogen-ion. The seed yeast, in the yeast-growing medium containing as one of its ingredients the ammoniacal salt, tends to build up a progressively increasing deleterious concentration of the hydrogen-ion, from the beginning of the yeast-growing operation such increase being due for the most part to the setting free by the yeast of acid components or ions from the salt during the assimilation of the ammoniacal nitrogen. When inorganic ammonium salts are employed, this increase in the original normal concentration of the hydrogen-ion has as its consequence the practical failure of the operation in so far as both yield and quality of the resulting product are concerned, and, when organic ammoniacal salts are employed it has as a consequence a limitation in the possible yield and a product of limited strength or vigor.

As will hereinafter more fully appear, the agent which we prefer to employ for preventing any such increase in the concentration of the hydrogen-ion as would be substantially deleterious to the yield or strength of the yeast to be produced, is an agent which will prevent by neutralization the tendency to such increase. Such an agent may be provided at any suitable stage of the operation,—even by adding it (as, for instance, in the form of calcium carbonate) to the batch at the very beginning of the yeast-growing operation, or adding it at intervals suitably spaced apart during the operation as, for instance, calcium carbonate or a carbonate of sodium, so as to prevent any substantial increase in the acidity; and the agent employed may be any suitable alkali such as an alkali metal hydrate or carbonate for example, sodium carbonate or a suitable alkaline earth metal carbonate such as calcium or magnesium carbonate, the purpose in all cases being to either guard continuously against the undesirable increase in acidity or increase in deleterious concentration of the hydrogen-ion, or to compensate for such permissible slight increase as may take place during appropriate short intervals between neutralization. It will be desirable to so apportion the agent employed that the concentration of the hydrogen-ion favorable to the yeast-growing operation shall be maintained, while any prejudical excess is nevertheless prevented.

As hereinbefore noted, it is customary, in the manufacture of yeast, to adjust the acidity of the malt wort or like medium at the start to a desired or preferred percentage. In yeast growing it is common practice to make a determination of the acidity of the wort and then to add a further quantity of lactic acid (produced in situ in the batch) so as to bring the total acidity to approximately $\frac{N}{100}$. For instance, on the assumption that the wort had an acidity of one-half $\frac{N}{100}$ to begin with, it would require approximately nine-twentieths of a gram of lactic acid per liter of wort to give the desired concentration of the hydrogen-ion. It will, of course, be understood that it may be desirable in some instances to have as the preferred practice a greater or smaller concentration of the hydrogen-ion, although the concentration that we have particularly referred to has given excellent results in connection with the practice of our invention.

In carrying out the invention, we have made various tests to determine to what extent the ammonium salts may be used toward supplying the nitrogen required for yeast. The following data indicates that the ammonium salt may be relied upon to supply by far the larger part of the nitrogen required by the yeast, even up to three-fourths and more of the requisite amount. On the other hand, when all of the nitrogen present was supplied by the use of ammonium salts, the yield of the yeast was materially less than when a portion of the nitrogen was supplied from other sources, such as the nitrogen from malt or other grains.

In the hereinafter described experiments, a given volume of malt wort containing approximately 5% of sugar material was used as a basis of experimentation. In various experiments this amount was materially reduced and the remainder of the volume was substituted with a 5% sugar solution. This decrease in the amount of wort used, not only reduced the amount of sugars, from that source, but also reduced the amount of yeast assimilable organic nitrogen present. The missing yeast assimilable organic nitrogen in the various experiments was supplied by the addition of appropriate amounts of compounds containing yeast assimilable inorganic nitrogen as, for example, ammonium salts.

The following tabulated statement presents the results of tests made to determine the yield of yeast, the loaf volume of bread leavened with the yeast, and the gas production of dough leavened with the yeast in consecutive columns numbered 1, 2, 3, 4 and 5, wherein, in column 1, the yeast-growing medium employed was 1000 cc. of a malt wort or solution of malt extract containing approximately 5% of sugar material, in which instance no ammoniacal salt being employed, the yield of yeast was 26.1 grams, the loaf volume 1700 cc. and the gas production 260 cc. In column 2, with the employment of 500 cc. of the same wort, 500 cc. of a 5% solution of cane sugar (containing in solution .66 grams $KH_2PO_4$) and with the employment of 2.5 grams of ammonium chloride and 3 grams of calcium carbonate (incorporated in the batch at the start of the yeast-growing period) the yield in yeast was 32.5 grams, the loaf volume 1770 cc. and the gas production 342 cc. In column 3, with the employment of 335 cc. of the same wort and 665 cc. of the same sugar solution, 3.3 grams of ammonium chloride and 3 grams of calcium carbonate, the yield of yeast was 31.3 grams, the loaf volume 1770 cc. and the gas production 355 cc. In column 4, with the employment of 250 cc. of the same wort and 750 cc. of the same sugar solution, 3.7 grams of ammonium chloride and 3 grams of calcium carbonate, the yield in yeast was 26.8 grams, the loaf volume 1820 cc. and the gas production 380 cc. As indicated in column 5, when the wort was omitted and 1000 cc. of the sugar solution was employed together with 5 grams of ammonium chloride and 3 grams of calcium carbonate, so that the ammoniacal salt alone was depended upon to supply the nitrogen required by the yeast, the yield of yeast fell off to 11.05 grams. In this instance, the loaf volume and gas production were not determined.

The tabulation referred to in the preceding paragraph is as follows:

|  | 1 | 2 | 3 | 4 | 5 |
|---|---|---|---|---|---|
| Malt wort or solution of malt extract contg. approx. 5% sugar material | 1000 cc. | 500 cc. | 335 cc. | 250 cc. | 0 |
| 5% solution of cane sugar | 0 | 500 cc. | 665 cc. | 750 cc. | 1000 cc. |
| Am. chloride | 0 | 2.5 | 3.3 | 3.7 | 5 |
| Calcium carbonate | 0 | 3.0 | 3.0 | 3.0 | 3.0 |
| Yield of yeast | 26.1 g. | 32.5 | 31.3 | 26.8 | 11.05 |
| Loaf volume | 1700 cc. | 1770 | 1770 | 1820 | ......... |
| Gas production of yeast in dough | 260 cc. | 342 | 355 | 380 | ......... |

It will be particularly noted in considering the foregoing table that the strength of the yeast, represented by the loaf volume and particularly by the gas production from the dough is an increasing factor of considerable amount with increasing proportions of the ammoniacal nitrogen employed in part substitution for the grain nitrogen. The gas production was determined by placing portions of the dough in bottles and connecting them with Bunsen gas holders in which the gas production could be accurately read.

Further tests were made with a standard solution consisting of a mixture of 335 cc. of a malt wort or solution of malt extract containing approximately 5% of sugar material and 665 cc. of a 5% solution of cane sugar to determine the relative yield of yeast, loaf volume and gas production when the ammonium salt employed was an inorganic salt, as in columns 1 and 2 of the following table, and when the ammonium salt was an organic salt such as the lactate or tartrate and also to determine the modifying effect of the employment of an agent for preventing a deleterious increase in the concentration of the hydrogen-ion. By reference to column 1 of said table, it will be noted that where 2.5 grams of ammonium chloride were added to the batch no neutralizing agent being employed, the acidity rose to $\frac{N}{50}$; the yield of yeast was 12.4 grams and the strength of the yeast is indicated by a loaf volume of 1690 cc. and a gas production of 510 cc. Referring to column 2, with the use of the same quantity of ammonium chloride but with the employment of 2.25 grams of calcium carbonate, the acidity was prevented from rising above $\frac{N}{119}$ and the resultant yield of yeast was 27.5 grams and of a strength indicated by a loaf volume of 1820 cc. and a gas production of 587 cc. Referring to column 3, the employment of 5 grams of ammonium lactate without the employment of a neutralizing agent gave an acidity of $\frac{N}{26}$ and a yield of yeast of 25.9 grams, a loaf volume of 1670 cc. and a gas production of 489 cc. as indicated in column 4. The employment with the same amount of ammonium lactate, of 2.25 grams of calcium carbonate gave an acidity of $\frac{N}{108}$ and an increased yield, i. e., 27.1 grams; furthermore, it will be particularly noted that with this increased yield the strength of the yeast was very materially increased, as indicated by a loaf volume of 1940 cc. and a gas production of 609 cc. In column 5, wherein 4.3 grams of ammonium tartrate were used but no neutralizing agent was used, the acidity was $\frac{N}{28}$, the yield of yeast was 24.1 grams, the loaf volume 1590 cc. and the gas production 455 cc. In column 6 with the employment of the same amount of ammonium tartrate and with the employment of 2.25 grams of calcium carbonate, the acidity was kept down to $\frac{N}{131}$ with a yield of yeast of 31 grams, and this increased yield was likewise accompanied with an increase in strength of the yeast represented by a loaf volume of 1840 cc. and a gas production of 577 cc.

The table referred to in the preceding paragraph is as follows:

|  | 1 | 2 | 3 | 4 | 5 | 6 |
|---|---|---|---|---|---|---|
| Malt wort or solution of malt extract contg. approx. 5% sugar material | 335 cc. | 335 | 335 | 335 | 335 | 335 |
| 5% solution cane sugar | 665 cc. | 665 | 665 | 665 | 665 | 665 |
| Ammoniacal salts | Am. chloride 2.5g | 2.5 | Am. lactate 5 | 5 | Am. tartrate 4.3 | 4.3 |
| CaCO₃ | 0 | 2.25g | 0 | 2.25 | 0 | 2.25 |
| Yield of yeast | 12.4g | 27.5 | 25.9 | 27.1 | 24.1 | 31.0 |
| Acidity reached | $\frac{N}{50}$ | $\frac{N}{119}$ | $\frac{N}{26}$ | $\frac{N}{108}$ | $\frac{N}{28}$ | $\frac{N}{131}$ |
| Loaf volume | 1690 cc. | 1820 | 1670 | 1940 | 1590 | 1840 |
| Gas production | 510 cc. | 587 | 489 | 609 | 455 | 577 |

Further examination of the foregoing table will indicate that, in the case of the use of the ammonium chloride, without the employment of the agent which tends to depress the hydrogen-ion concentration, the batch will not tolerate an acidity of $\frac{N}{50}$ without reducing the yield to a low figure. This is doubtless due to the fact that the increase in acidity when the ammonium chloride is used is due to the production of a strong acid (namely hydro-chloric acid). On the other hand, where the organic salts (such as the lactate or tartrate are employed) the batch will tolerate an acidity as high as $\frac{N}{26}$ (column 3) or $\frac{N}{28}$ (column 5), and yet give a fairly large yield of yeast; although, in both cases, as is shown by columns 4 and 6 respectively, the keeping down of the acidity to a degree indicated by $\frac{N}{108}$ and $\frac{N}{131}$ respectively gives an increase in yield and particularly an increase in yeast strength.

It will be noted from the table just under consideration that where the calcium carbonate is incorporated in the batch at the start of the yeast-growing period, the acidity drops somewhat below the preferable degree $\left(\text{say } \frac{N}{100}\right)$. In some instances, it may be preferred to maintain the acidity nearer the preferable degree and this may be readily effected, as hereinbefore pointed out, by supplying the neutralizing agent at intervals during the process. For instance, a yield of 63.2 grams of yeast and an acidity of $\frac{N}{81}$ was obtained from the growing of the yeast in a medium made up of 2400 cc. of malt wort. On the other hand, when the yeast-growing medium was made up of 800 cc. of wort and 1600 cc. of the sugar solution, and contained 6 grams of ammonium chloride, the addition of a neutralizing agent in the form of a normal solution of sodium bicarbonate ($NaHCO_3$) at intervals of one hour gave a final acidity of $\frac{N}{89}$ and a 68.6 gram yield of yeast.

Rate of adding solution of $NaHCO_3$

| | |
|---|---|
| After one hour | 10 cc. |
| " two hours | 10 cc. |
| " three hours | 15 cc. |
| " four hours | 15 cc. |
| " five hours | 15 cc. |
| " six hours | 15 cc. |
| " seven hours | 15 cc. |

The above table indicates the rate of addition of the solution of sodium bicarbonate as made in the test just referred to which was concluded in about eight hours.

Referring further to the agent which may be employed for preventing a deleterious rise in acidity, it may be pointed out that where an inorganic ammoniacal salt is employed (such as the chloride or the sulfate, yielding a strong acid) it will be of advantage to likewise add such a proportion of an organic alkali salt (such as sodium tartrate) to convert the strong acid, as it forms, into the undissociated weaker acid which, as we have pointed out, may be tolerated in larger amount in the batch.

It will be obvious from the preceding description, that the term "yeast", as involved in the subject-matter of our invention, hereinafter claimed, refers to bakers' yeast adapted for use in the making of bread.

Having described our invention, what we claim as new and desire to secure by Letters Patent, is:—

1. The process of manufacturing yeast which comprises preparing a yeast nutrient solution containing essentially sugar material and other yeast nutrients, including cereal material and a compound containing inorganic nitrogen, propagating yeast therein, such compound containing inorganic nitrogen being adapted to supply assimilable nitrogen to the yeast and, during such assimilation, to set free components which tend to build up a progressively increasing acidity, and during the propagation neutralizing progressively the deleterious excess of such acidity.

2. The process of manufacturing yeast which comprises preparing a yeast nutrient solution containing essentially sugar material, and other yeast nutrients, including cereal material and an inorganic nitrogen containing compound, propagating yeast therein, and neutralizing progressively the deleterious excess of inorganic acid liberated during propagation.

3. The process of manufacturing yeast which comprises preparing a yeast nutrient solution containing essentially sugar material and other yeast nutrients, including cereal material and a compound containing inorganic nitrogen, propagating yeast therein, such compound containing inorganic nitrogen being adapted to supply assimilable nitrogen to the yeast and, during such assimilation, to set free components which tend to build up a progressively increasing acidity, and during the propagation neutralizing progressively the deleterious excess of such acidity, by the addition of an acid neutralizing substance.

4. The process of manufacturing yeast which comprises preparing a yeast nutrient solution containing essentially sugar material and other yeast nutrients, including cereal material and a compound containing inorganic nitrogen, propagating yeast therein, such compound containing inorganic nitrogen being adapted to supply assimilable nitrogen to the yeast and, during such assimilation, to set free components which tend to build up a progressively increasing acidity, and during the propagation neutralizing progressively the deleterious excess of such acidity by the fractional addition of an acid neutralizing substance.

5. The process of manufacturing yeast which comprises preparing a yeast nutrient solution containing essentially sugar material and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation adding a substance which acts to depress the hydrogen-ion concentration.

6. The process of manufacturing yeast which comprises preparing a yeast nutrient solution containing essentially sugar material and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation fractionally adding a substance which acts to depress the hydrogen-ion concentration.

7. The process of manufacturing yeast which comprises preparing a yeast nutrient solution containing essentially sugar material, and other yeast nutrients, including cereal material and an inorganic nitrogen containing compound propagating yeast therein, and during propagation, preventing the rise of the hydrogen-ion concentration to a degree such as would be deleterious to multiplication of the yeast, by adding a substance which acts to depress the hydrogen-ion concentration.

8. The process of manufacturing yeast which comprises preparing a yeast nutrient solution containing essentially sugar material, and other yeast nutrients, including cereal material and an inorganic nitrogen containing compound, propagating yeast therein, and during propagation preventing the rise of the hydrogen-ion concentration to a degree such as would be deleterious to multiplication of the yeast, by fractionally adding a substance which acts to depress the hydrogen-ion concentration.

9. The process of manufacturing yeast which comprises preparing a yeast nutrient solution containing essentially sugar material, and other yeast nutrients, including cereal material and an inorganic nitrogen containing compound, propagating yeast therein, and neutralizing progressively the deleterious excess acid liberated during propagation, by fractional addition of a carbonate of sodium.

10. The process of manufacturing yeast which comprises preparing a yeast nutrient solution containing essentially sugar material, and other yeast nutrients, including cereal material and an inorganic nitrogen containing compound, propagating yeast therein, and neutralizing progressively the deleterious excess acid liberated during propagation, by fractional addition of sodium carbonate.

11. The process of manufacturing yeast which comprises preparing a yeast nutrient solution containing essentially sugar material, and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation maintaining the hydrogen-ion concentration below that which would be deleterious to multiplication of the yeast, by the addition of a substance which acts to depress the hydrogen-ion concentration.

12. The process of manufacturing yeast which comprises preparing a yeast nutrient solution containing essentially sugar material, and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation maintaining the hydrogen-ion concentration below that which would be deleterious to multiplication of the yeast, by the addition of an acid neutralizing substance.

13. The process of manufacturing yeast which comprises preparing a yeast nutrient solution containing essentially sugar material, and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation maintaining the hydrogen-ion concentration below that which would be deleterious to multiplication of the yeast, by the addition of a carbonate of sodium.

14. The process of manufacturing yeast which comprises preparing a yeast nutrient solution containing essentially sugar material, and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation maintaining the hydrogen-ion concentration below that which would be deleterious to multiplication of the yeast, by the addition of sodium carbonate.

15. The process of manufacturing yeast which comprises preparing a yeast nutrient solution containing essentially sugar material, and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation maintaining the hydrogen-ion concentration below that which would be deleterious to multiplication of the yeast, but not below that required for such multiplication, by the addition of a substance which acts to depress the hydrogen-ion concentration.

16. The process of manufacturing yeast which comprises preparing a yeast nutrient solution containing essentially sugar material, and other yeast nutrients, including cereal material and an inorganic nitrogen containing compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation maintaining the solution at such a hydrogen-ion concentration as would correspond to an acidity of substantially $\frac{N}{100}$, by the addition of a substance which acts to depress the hydrogen-ion concentration.

17. The process of manufacturing yeast which comprises preparing a nutrient wort, including such amounts of cereal material, sugar material, and water, that the resultant wort contains substantially the same amount of sugar material and a less amount of yeast-assimilable nitrogen than the amounts usually present in a cereal wort, supplying the missing yeast-assimilable nitrogen by the addition of an inorganic compound containing yeast-assimilable nitrogen, propagating yeast therein, and neutralizing progressively the deleterious excess of acid liberated during propagation.

18. The process of manufacturing yeast which comprises preparing a nutrient wort, including such amounts of cereal material, sugar material, and water, that the resultant wort contains substantially the same amount of sugar material and a less amount of yeast-assimilable nitrogen than the amounts usually present in a cereal wort, supplying the missing yeast-assimilable nitrogen by the addition of an inorganic compound containing yeast-assimilable nitrogen, propagating yeast therein, and neutralizing progressively the deleterious excess of inorganic acid liberated during propagation.

19. The process of manufacturing yeast which comprises preparing a nutrient wort, including such amounts of cereal material, sugar material, and water, that the resultant wort contains substantially the same amount of sugar material and a less amount of yeast-assimilable nitrogen than the amounts usually present in a cereal wort, supplying the missing yeast-assimilable nitrogen by the addition of an inorganic compound containing yeast-assimilable nitrogen, propagating yeast therein, and neutralizing progressively the deleterious excess of acid liberated during propagation, by fractional addition of an acid neutralizing substance.

20. The process of manufacturing yeast which comprises preparing a nutrient wort, including such amounts of cereal material, sugar material, and water, that the resultant wort contains substantially the same amount of sugar material and a less amount of yeast-assimilable nitrogen than the amounts usually present in a cereal wort, supplying the missing yeast-assimilable nitrogen by the addition of an inorganic compound containing yeast-assimilable nitrogen, propagating yeast therein, and neutralizing progressively the deleterious excess of acid liberated during propagation, by fractional addition of a carbonate of sodium.

21. The process of manufacturing yeast which comprises preparing a nutrient wort, including such amounts of cereal material, sugar material, and water, that the resultant wort contains substantially the same amount of sugar material and a less amount of yeast-assimilable nitrogen than the amounts usually present in a cereal wort, supplying the missing yeast-assimilable nitrogen by the addition of an inorganic compound, propagating yeast therein, such nitrogen containing compound being adapted to supply assimilable nitrogen to the yeast and, during such assimilation, to set free components which tend to build up a progressively increasing deleterious hydrogen-ion concentration, and during the propagation maintaining the hydrogen-ion concentration below that which would be deleterious to multiplication of the yeast, by the addition of a substance which acts to depress the hydrogen-ion concentration.

In testimony whereof we affix our signatures.

HENRY A. KOHMAN.
ROY IRVIN.
ROBERT J. CROSS.